United States Patent
Tomkins

(10) Patent No.: US 11,363,116 B2
(45) Date of Patent: *Jun. 14, 2022

(54) SYSTEMS AND METHODS FOR INTELLIGENT ROUTING AND CONTENT PLACEMENT IN INFORMATION CENTRIC NETWORKS

(71) Applicant: Ciena Corporation, Hanover, MD (US)

(72) Inventor: Robert Kevin Tomkins, Ottawa (CA)

(73) Assignee: Ciena Corporation, Hanover, MD (US)

( * ) Notice: Subject to any disclaimer, the term of this patent is extended or adjusted under 35 U.S.C. 154(b) by 88 days.

This patent is subject to a terminal disclaimer.

(21) Appl. No.: 16/944,515

(22) Filed: Jul. 31, 2020

(65) Prior Publication Data

US 2020/0374369 A1 Nov. 26, 2020

Related U.S. Application Data

(63) Continuation of application No. 15/914,492, filed on Mar. 7, 2018, now Pat. No. 10,771,590.

(51) Int. Cl.
| | | |
|---|---|---|
| *H04L 67/63* | (2022.01) | |
| *H04L 45/745* | (2022.01) | |
| *H04L 45/02* | (2022.01) | |
| *H04L 67/5681* | (2022.01) | |

(52) U.S. Cl.
CPC ............ *H04L 67/327* (2013.01); *H04L 45/02* (2013.01); *H04L 45/7457* (2013.01); *H04L 67/2847* (2013.01)

(58) Field of Classification Search
None
See application file for complete search history.

(56) References Cited

U.S. PATENT DOCUMENTS

| | | | | |
|---|---|---|---|---|
| 10,069,725 | B1* | 9/2018 | Talur | H04L 45/50 |
| 2013/0159383 | A1* | 6/2013 | Tuliani | H04L 67/2842 |
| | | | | 709/203 |
| 2013/0219081 | A1* | 8/2013 | Qian | H04L 45/02 |
| | | | | 709/241 |
| 2016/0285671 | A1* | 9/2016 | Rangarajan | H04L 67/327 |
| 2016/0294956 | A1* | 10/2016 | Fix | H04L 41/147 |
| 2017/0134276 | A1 | 5/2017 | White et al. | |
| 2018/0006833 | A1* | 1/2018 | Tatlicioglu | H04L 45/745 |

OTHER PUBLICATIONS

Dibenedetto et al., "Routing Policies in Named Data Networking," ICN '11: Proceedings of the ACM SIGCOMM workshop on Information-centric networking, Aug. 2011, pp. 38-43.
Zhang et al., "Named Data Networking," ACM SIGCOMM Computer Communication Review, vol. 44, Issue 3, Jul. 2014, pp. 66-73.
Abraham et al., "Forwarding strategies for applications in a named data networking," ANCS '16: Proceedings of the 2016 Symposium on Architectures for Networking and Communications Systems, Mar. 2016, pp. 111-112.

* cited by examiner

*Primary Examiner* — Jeffrey R Swearingen
(74) *Attorney, Agent, or Firm* — Clements Bernard Baratta; Lawrence A. Baratta, Jr.; Christopher L. Bernard

(57) ABSTRACT

A content caching system enables an NDN network to place content closer to each end user(s) and to provide an explicit path for the target end user(s) to that content for better performance just in advance of users' anticipated request(s). The apparatus includes NDN routers and SDN controller employing a content commander, at least a content placement agent and at least one content analysis agent.

20 Claims, 12 Drawing Sheets

SYSTEMS AND METHODS FOR INTELLIGENT ROUTING AND CONTENT PLACEMENT IN INFORMATION CENTRIC NETWORKS

CROSS-REFERENCE TO RELATED APPLICATION(S)

The present disclosure is a continuation of U.S. patent application Ser. No. 15/914,492, filed on Mar. 7, 2018, the contents of which are incorporated by reference in their entirety.

TECHNICAL FIELD

The proposed solution relates to content routing and distribution in a communications network, and in particular to systems, components and methods for intelligent routing and content caching in information centric networks.

BACKGROUND

Information Centric Networking (ICN) is a concept that evolved from Project Xanadu in 1979 based on the proposition than networking was to be less about connecting a specific human to another specific human, and more information centric. This concept was further refined by Van Jacobsen's "Dissemination Networking" which evolved into a first implementation called Content Centric Networking (CCN) in 2006. The most active definition of Information/Content Centric Networking is Named Data Networking (NDN) which has been researched by UCLA REMAP.

NDN, as the most state of the art ICN & CCN, leverages replication of information, information which may reside in multiple locations. This contrasts with Internet Protocol (IP) networking which relies on addressing to identify a single source of information and a single destination for the information. NDN does not require IP, TCP, or UDP protocols, but can operate over them as an overlay just as it can operate over bare Ethernet. To date, the Internet has been striving to serve information largely through the deployment of Content Distribution Networks (CDN) over IP networking leveraging IP redirection. CDN networks are often based on proprietary technology and often have content specific overlays (e.g. video) to treat that traffic differently. Over half of today's "Internet" traffic does not traverse the Internet Core, but instead traverses a CDN.

In contrast, NDN has demonstrated a superior value proposition through stronger security, scalability, application coding simplification, highly scalable routing, simplified network stack for the Internet of Things, elimination of the complex wireless IP persistence overlay, rapid network/router switching when mobile, efficient multi-destination multi-source networking, and enhanced congestion control. It is anticipated that NDN solutions will begin the commercial proof of concept and deployment in the 2018/19 timeframe particularly for military, Internet of Things, and mobility deployment.

NDN forwards content based on the Universal Resource Identifier (URI) instead of resolving the URI to an IP address. NDN has two different types of packets: interest packets and data packets. Forwarding is highly programmable. Interest packets are generally forwarded towards all next hops with the best match to the URI's hierarchical name. If an interest packet hits a dead end, it is forwarded back to its last branching point to deliver failure messages to inform the nodes along that branch path that that content is not available along that path. If the interest packet finds the desired URI content, assuming the interested node was authorized to access the content, the content is forwarded as data packets back along the path the interest packet successfully took. As the data packets are forwarded towards their interested node destination the data packets may undergo a wide variety of content and non-content specific treatment not the least of which is caching (through an integrated "Repo" app) of that content to facilitate mobile users and to permit accounting for content popularity. In NDN it is assumed that most network nodes have some degree of storage to facilitate caching.

Routing in NDN is highly flexible with most recent implementations being based on Link State Routing. Instead of identifying the IP subnets reachable by a network node and its links, content is advertised by content providers as available through NDN's hierarchical naming structure. Other routing implementations are feasible, like Greedy Geographic Routing.

For clarity, the description of NDN and ICN hereinabove is high level and intended only to provide a limited background on the nature of NDN routing and NDN applications in order to simplify disclosure herein. Only a limited relevant NDN description is provided herein.

SUMMARY

There is a need to improve in several areas including Software Defined Networking (SDN) for NDN/CCN/ICN, and to coordinate content placement and routing in a Content Provider/Service Provider ecosystem.

A big shortcoming of NDN and ICN attempts considered to date is reliance on a distributed routing paradigm. The introduction of SDN provides logically centralized control of routing. It has been suggested that SDN will not scale to meet the needs of NDN. However, it has been discovered that SDN implemented in a cloud computing environment with domains can certainly scale to meet this need.

Further, in accordance with current attempts, the placement of content is left to nodal devices to determine whether to cache locally (via the Repo process) or not, wherein making such decision is typically only possible, and performing the caching is typically only possible, when content is available by being transmitted via such a node. As such, current NDN attempts provide suboptimal routing and content placement which has been discovered can be optimized by more centralized solutions for performance, latency, cost, power consumption, etc.

Previous attempts, including an IP network with a CDN overlay, have been found to be less flexible in terms of content placement wherein most Internet Service Providers (ISPs) have no caching or have only a single layer of caching hierarchy which is only able to cache ISP & unencrypted content. Further caching decisions are usually made on the fly by an in-cache policy in an IP network. In this regard, it has been found that making caching decisions instead of intelligent centralized planning provides an improvement.

In most current ISP CDN deployments content has a single origin server which can be a significant bottleneck as well a target for security attacks. Attempts to load-balance this sourcing function, in a geographically significant way, are problematic in CDN deployments in that they often lack real time network condition awareness, do not always identify the best origin server, and are technically complex.

The most advanced traffic placement methodologies to date focus on placing content that a community of geographically associated users is anticipated to desire in the closest cache to the community (e.g. Netflix pre-distribution of new content) or pre-anticipation of an active user's next action (e.g. to watch the next episode or watching a video embedded in a webpage the user is currently actively reviewing), and caching it close to the user.

In accordance with the proposed solution, a distributed networking solution is employed in combination with on-network content placement using intelligent real time centralized on-network content placement decision making. This puts control of all the content, and how it is routed to all destinations, into intelligent analytics applications which can optimize the content placement and routing.

In some embodiments, centralized routing and forwarding in an NDN or ICN network is provided. Some implementations create a novel content distribution network which combines NDN with an evolved version of SDN. Some implementations can be based on Named Data Network Software Defined Network Northbound Interface (NDN SDN NBI) while other implementations can be based on Named Data Network Software Defined Network Southbound Interface (NDN SDN SBI). Other implementations modify the SDN controller concept to employ the hierarchical nature of a URI, integrate and extract URI's for the NDN Forwarding Information Base (FIB) by identifying which outbound port most of the content for an URI hierarchy is destined to and adding explicit URI entries or child entries for exceptions.

Other embodiments provide a content placement system that is network aware and can dynamically identify the optimal location for anticipated content to be cached in an NDN/ICN network. Some implementations are enabled by a content placement software system and Content Analytics/Content Placement Agents (CA CPA).

Other embodiments provide a Content Commander configured to pre-cache content (via a CC NDN Agent) and provides dynamic routing, forwarding, and the traffic handling of the content via an NDN SDN controller.

In other embodiments the combination of the Content Placement and the Content Commander provide a more unified and more efficient solution by optimizing the source selection for content, optimizing the caches for content, optimize content route from source to cache(s), pre-defining the route from source/cache to target user locations, pre-defining traffic treatment from source/cache to target user including on-the-fly processing, and aging out/adjusting the same based on content changes, content availability, content popularity, network topology, network congestion, user population location, user interest, and user behavior.

Some implementations specify the placement of a single unit of content, a collection of content in a target cache or collection of caches, and the timing/aging of that content in the cache. Other implementations provide the ability to create multiple origin/source servers that are geographically diversely located that would exceed the limitations of today's load balancing systems. Further implementations provide improved source selection for each target cache(s) routing. Further implementations improve routing from source to cache, and from source (e.g. live video) or cache to targeted user locations for a unit of content or a collection of content. This includes routing around anticipated congestion points, routing based on content Quality of Experience, and pre-establishing backup routes from alternate caches. Yet further implementations provide customization of forwarding behavior of content traffic from cache to user including forwarding any combination of:

Defining in the NDN Forwarding Information Base (FIB) the forwarding of content from one or more egress faces;

Defining network interfaces for specific traffic including traffic shaping, policing, emission control, discard, port;

Defining application interfaces for specific pre-processing of content;

Defining the forwarding behavior should a face be down or congested; and

Downloading applications for pre-preprocessing content.

Yet other embodiments provide the ability to extend the above systems and methods to a multi-party Content Provider to Service Provider provisioning model.

BRIEF DESCRIPTION OF THE DRAWINGS

The proposed solution will be better understood by way of the following detailed description of embodiments of the proposed solution with reference to the appended drawings, in which.

DETAILED DESCRIPTION

Figure 1:
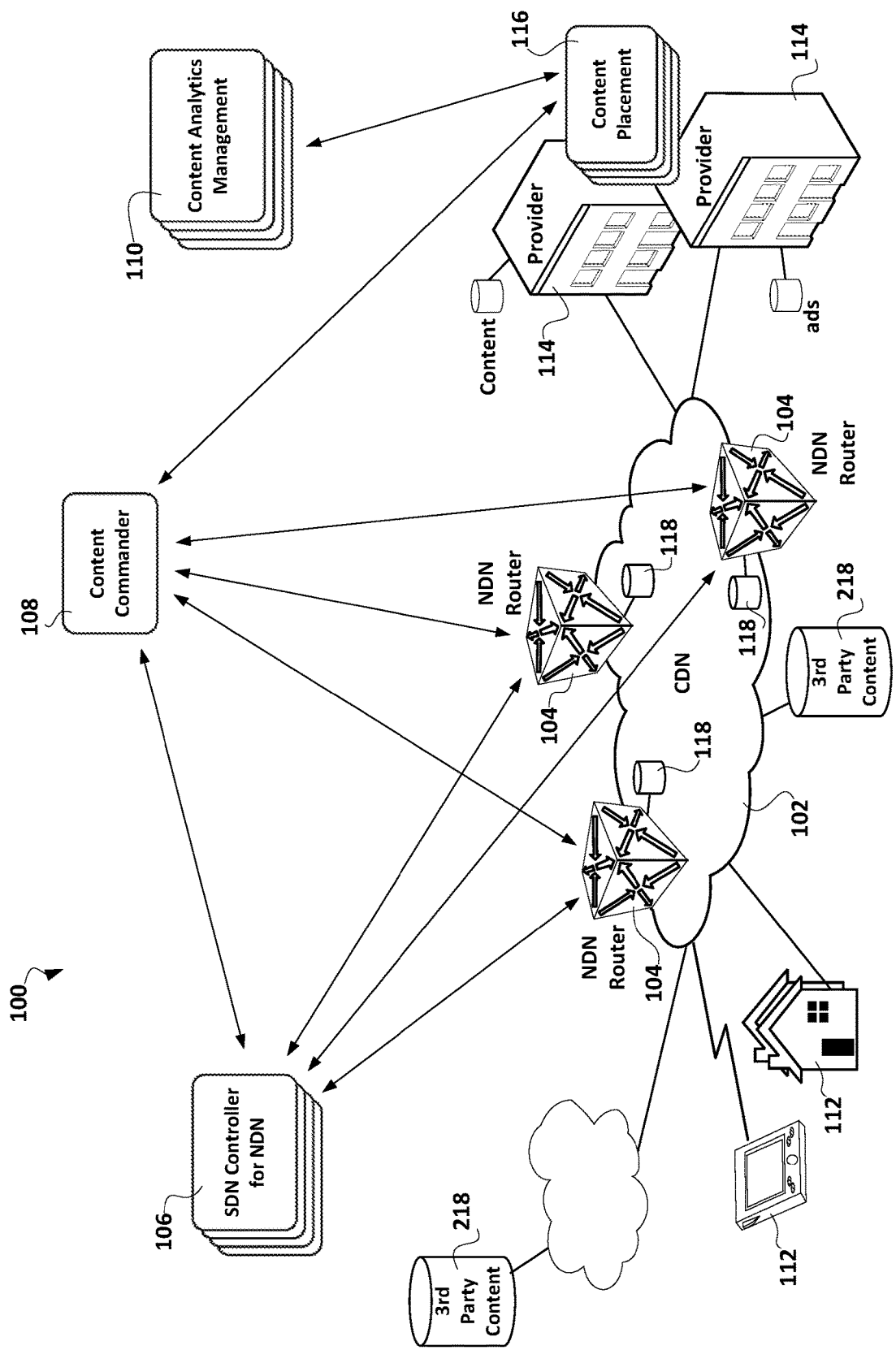
FIG. 1 is a schematic diagram illustrating a top-level network map in accordance with an embodiment of the proposed solution.

With reference to FIG. 1 the proposed solution includes a transport and Content Distribution Network (CDN) 102 including NDN devices such as NDN routers 104. Typically, more than one SDN controllers 106 is employed for the CDN network 102 and/or a control system configured to route information to the NDN routers 104 by:

Employing Universal Resource Identifiers (URIs) as hierarchical addressing and configured to develop content availability and distribution maps;

Configured to route content based on URIs and provide up to 4 next hops instead of just one next hop;

Configured to interface to the NDN devices' (104) Routing App, the Routing Information Database (RIB) manager, or the Forwarding Information Database (FIB);

Executing the above via modified OpenFlow, Netconf, or REST API calls by including URIs, multiple next hop forwarding actions, and associated statistics collection for NDN. In this regard, it may be preferable to link a Content Commander application 108 to multiple controllers 106, a network management system, and/or an orchestrator.

A Software Defined Networking (SDN) controller 106 can also be communicatively coupled to the network 102 through one or more of the nodes 104. SDN is an emerging framework which includes a centralized control plane decoupled from the data plane. SDN provides the management of network services through abstraction of lower-level functionality. This is done by decoupling the system that makes decisions about where traffic is sent (the control plane) from the underlying systems that forward traffic to the selected destination (the data plane). SDN works with the SDN controller 106 knowing a full network topology through configuration or through the use of a controller-based discovery process in the network 102. An SDN controller 106 differs from a management system in that it controls the forwarding behavior of the nodes 104 only, and performs control in real time or near real time, reacting to changes in services requested, network traffic analysis and network changes such as failure and degradation. Also, the SDN controller 106 provides a standard northbound interface to allow applications to access network resource information and policy-limited control over network behavior or treatment of application traffic. Each SDN controller 106 sends commands to controlled nodes 104 to control matching of data flows received and actions to be taken, including any manipulation of packet contents and forwarding to specified egress ports. An example of SDN is OpenFlow (www.opennetworking.org).

Note, the network 102 can use a control plane (not illustrated) separately from the SDN controller 106. Conversely, the network 102 can use an SDN controller 106 separately from its control plane. Also, the control plane can operate in a hybrid control mode with the SDN controller 106. In this scheme, for example, the SDN controller 106 does not necessarily have a complete view of the network 102. Here, the control plane can be used to manage services in conjunction with the SDN controller 106. The SDN controller 106 can work in conjunction with the control plane in the sense that the SDN controller 106 can make the routing decisions and utilize the control plane for signaling thereof.

Additionally, the network 102 can include a Network Management System (NMS) 20 (illustrated in FIG. 11) which is a management platform providing an integrated source for Operations, Administration, Maintenance, And Provisioning (OAM&P). The NMS can include one or more servers and associated User Interfaces providing a network operator OAM&P access and control. Of note, the NMS does not perform the same level of functionality as the SDN controller 106, i.e., the NMS is more of a passive management device rather than actively involved in network control.

Typically, more than one Content Analytics application 110 is employed configured to analyze user 112 behavior (e.g. search, ads, or video) to:

Analyze the content currently and most recently viewed by the user 112;

Determine what content is likely to be requested by each user 112 (User is watching "The Crown Season 1" Episode 3 and is likely to request Episode 4 next);

Determine what content a provider 114 would like the user 112 to see (e.g. ads for outdoor camping stores near where the user 112 is searching mountain climbing); and Determine within what period of time the user 112 is likely to watch the subsequent content and the likelihood of watching it within that time period.

At least one but typically more than one Content Placement application 116 is employed (e.g. built into an Online Video System 114 or Online Video Analytics for Video, Ad management system 114, etc.) configured to:

Obtain network topology from network management, orchestration, controller 106, and/or CDN network 102;

Provide usage information to the content analytics system 110;

Utilize results of analysis from the content analytics application 110 to determine content that the user 112 is likely to request next;

Identify network location of users 112 with common next content;

Group users 112 together by common next content;

Provide content commander 108 with a list most likely content to be requested by users 112, likelihood, and timeframe; and Identify best placement(s) of content within network device(s) 104 to provide responsive content delivery while minimizing network and storage costs.

At least one Content Commander application 108 is employed to obtain information from one or more content placement systems 116 and is configured to:

Request content caching on a particular NDN device 104 by communicating with the Repo application or a Content Commander agent application on the NDN device 104 or by injecting a request for the content into the network 102 via network management, orchestration, or controller 106. If communicating to Repo or Content Commander agent, it could also specify time to live of the content; and Inform controller 106, orchestrator, and/or network management of new content placement. It may also specifically define explicit paths for the target users 112 to take to the newly cached content either through the controller 106, orchestrator, network management and/or the NDN devices 104.

System 100 allows CDN network 102 to place content closer to the end user(s) 112 and to have explicit paths for each target end user 112 to that content for better performance just in advance of each user's anticipated request.

System 100 is better suited for trading off performance vs. Quality of Experience (QoE), storage resources, network resources in a NDN CDN by specifically placing content on network nodes 104 and preconfiguring NDN forwarding paths to that content for a target audience (112).

The proposed solution can be further extended to multi-party content distribution.

Figure 2:
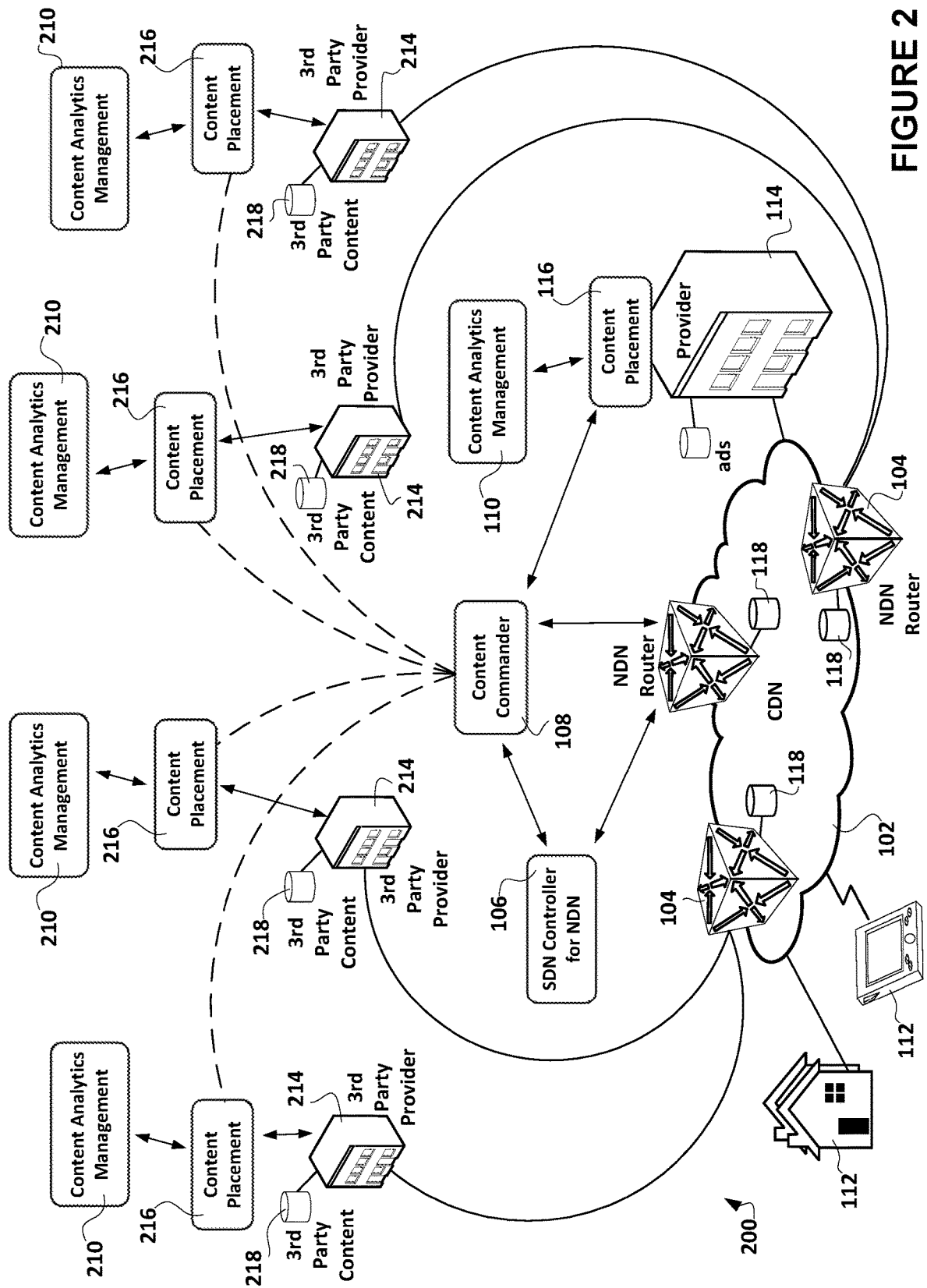
FIG. 2 is another schematic diagram illustrating a top-level network map in accordance with another embodiment of the proposed solution.

In some embodiments, with reference to FIG. 2, the Service Provider (SP) 114 offers an additional (business-to-business, client-to-business) service which enables 3rd party content providers' (CPs 214) content to be placed close to the end user 112 through NDN. Note that there may be intermediary networks between the CP 214 and SP 114.

In some implementations, each third-party CP 214 would have their own content analytics 210 and their own content placement system 216 or use the SP's content placement system 116. The CP's content placement system 216 can feed requests for content placement to the SP's content commander 108.

Within this setup, the content commander 108 can create a mapping of each planned content placement and users 112 that would have a route established or are expected to draw on that content at that placement. A content provider generated policy on the content commander 108 or the CP's Content Placement 216 and/or Content Management tools would determine whether to proceed with the placement (in near real-time) and respond back to the content commander 108. Such policies can for example take into account ad placement decisions in caching third party content 218 at NDN nodes 104. Other factors can be considered as well. In other implementations, the Content Commander Content Placement Agent's (CC CPA) may include firewall functions and other business-to-business API service functionality.

Any content 118 where service provider 114 was asked to place 3rd party content would generate a billing record for the content provider 214, the billing record can be generated through an API from the content commander 108 to the service provider billing system, e.g. Operations Support Systems/Billing Support Systems (OSS/BSS). In some implementations the billing record can have a per transaction fee, which may vary by type of content/expected QoE, as well a fee based on the file size and cache time. In other implementations, a further charge, or in some cases a refund, can be made each time the content was ultimately requested by the end user 112. Such charge/refund can likely be based on file size and type of content/expected QoE.

A common use for the system and methods proposed herein is to personalize the user's (112) experience and provide a better user Quality of Experience by minimizing latency and congestion. The above shows the use of two analytics systems 110/210. Content analytics 110 identifies content for the user 112 to consume. In accordance with one implementation this includes identifying new content offered by the user's service provider; in other implementations this includes evaluating the users' (112) historical content viewing in the context of users' location, time of day, users' device, etc. to identify potential content (based on history and newly available content) and where, when, and from what the user 112 is likely to consume the content (218). In yet other implementations analytics include an advertising perspective which identifies the advertising content the service provider 114 wants to target for the user 112. As with the content analytics, some advertisement related analytics can include static ads and other advertisement related analytics include identifying the advertisements most likely to succeed based on user history, new content, user device, time of day usage, user location, telemetry, etc. Both the content and advertising analytics systems could also provide an assessment of the likelihood a user 112 would successfully consume the content and any performance restrictions (e.g. VR content with low latency needs).

In some implementations content and advertising analytics feed their output to content placement system 116/216. It is important to note that the output from the content analytics 110/210 can be real-time and can be additive (e.g. user just started episode 3 therefore pre-cache episode 4) or destructive (i.e. withdrawing a user's interest in content). The content placement system 116/216 is configured to consider the content identified, its requirements, and map the content to the user's devices 112 perhaps with the user's likely network location by time of day and likelihood of consumption with the device, location, and time. From this, the content placement system 116/216 can determine when and where in the network 102 to cache the content including ads. Note that because this is an CDN network 102 including NDN routers 104, content and ads can be cached in almost any network node/router 104. The content placement system 116/216 can also decide not to cache, but to pre-populate a route from the source 114/214 to all potential destinations 112 above a certain likelihood. (The content placement system 116/216 can also decide not to do anything about the content request.) Such decisions are resource (e.g. network bandwidth/latency/state and cache size), policy, and content based.

In some implementations, the content placement system 116/216 can provide the content caching, and path pre-population decisions to the content commander 108 including when to populate and depopulate items from each NDN router cache 118. The content placement system 116/216 can be configured to provide feedback or configuration changes into the content analytics system 110/210 based on policy or actual system performance. For example, if the content placement system 116 is heavily loaded, it could provide guidelines to the content and advertising analytics 110/210 to dial back requests.

In preferred embodiments, the content commander 108 is responsible for pre-caching the content as outlined by the content placement system 116/216. It manages a subset of the cache 118 on each applicable NDN router 104 including adding and removing content by accessing the NDN routers' Repo application. In some implementations an NDN application on the NDN router 104 is provided and configured to request content from the source 114/214. The content commander 108 can be further configured to also request the SDN Controller 106 for CDN 102 to provision the routing to ensure the users 112, where and when their presence is anticipated, have a predefined route to the content on all NDN routers 104 from the cache to end user 112 as opposed to more typical NDN routing and forwarding approaches.

The above systems and components can be employed for example to provide live streaming events advertising such as during live audio/visual streaming events (e.g. sports matches, live competitions, live concerts, live theater, fund-raising drives, live news events, etc.) Typical live streaming events top out at 10 Million live streams. The most significant limitations to live event streaming are the advertising infrastructure and the distribution infrastructure. In the following, user 112, viewers 112, set-top devices 112, mobile applications 112, browsers 112, readers 112, etc. will be used interchangeably.

As an example, and without limiting the invention, viewers 112 are watching, or listeners 112 are listening to, a sporting event and a major player just got injured. After a typical replay, the event broadcaster 214 decides to go to ad. This is a centralized decision propagated to all users 112. The decision can be broadcast in the live event stream itself or by out-of-band broadcast signaling. Suddenly, in the same next millisecond, all 10 Million streaming video players 112 associated with viewers 112 reach out to their advertising servers for advertising. Such pull requests will likely be redirected to a national or local ad source, but even such typical systems are not designed to service and respond to such a high inrush of requests at the same time to provide an un-interrupted stream real-time playback. To maximize profitability, it would be desired for each ad request to be responded to with the most applicable ad content for that viewer 112. As can be appreciated, this is a massive and immediate compute and network infrastructure stress.

However, employing the proposed solution all advertisements can be pre-personalized and placed (118) in the NDN routers 104 closest to the viewer 112. The responses for the ad request can be cached as well, such that when the cut-to-ad occurs, there is comparatively less content traffic in the core of the network 102 than would otherwise be required to service all ad requests across the network 102.

Figure 3A:
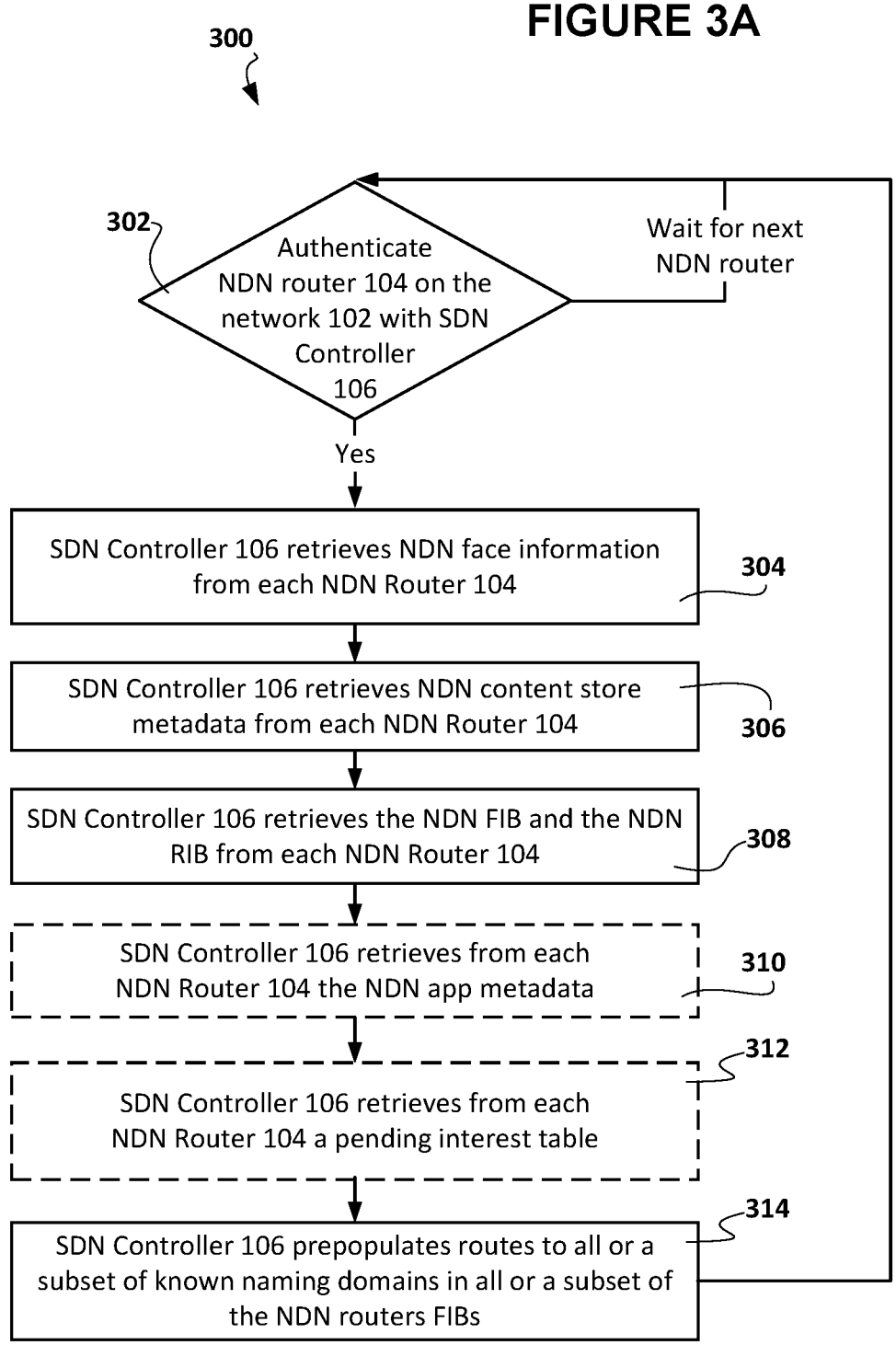
FIGS. 3A, 3B and 3C are a flow diagram illustrating initialization functionality in accordance with some embodiments of the proposed solution.

FIG. 3A illustrates a generic initialization process 300. In an initial state, the SDN Controller(s) for NDN 106 has authenticated 302 each NDN router 104 on the network 102. Note that the functions of the SDN controller 106 could alternately be performed by an NDN aware orchestrator, a network management system, or a hierarchy of such components. The SDN controller 106 retrieves 304 from each NDN router 104 the NDN face information contained in that NDN router 104 including mapping the face to an internal interface, a logical interface, or a physical interface with the generic or vehicular link service defined in NDN which map these logical and physical interfaces to their transport components including but not limited OS/UNIX transport, Ethernet, TCP, and UDP which are ultimately mapped to a socket. The NDN face information would also include all key physical attributes of the physical interface including bandwidth, packets in/out/discarded, etc. SDN controller 106 also retrieves 306 from each NDN router 104 their NDN content store (118) metadata including URI names, interest, stale times, and current content store policy. Further, the SDN controller 106 retrieves 308 the NDN Forwarding Information Base (FIB) and the NDN Routing Information Base (RIB) from each NDN router 104 including all name entries and their next hop faces and a cost per face.

The SDN controller 106 optionally retrieves 310 from each NDN router 104 the NDN app metadata including at least the app title, usage, version, and size. The SDN controller 106 retrieves 312 from each NDN router 104 any available pending interest table for active users 112. It is understood that process 300 executes in parallel and can be retriggered with changes in NDN routers' 104 and users' 112 activity.

Figure 3B:
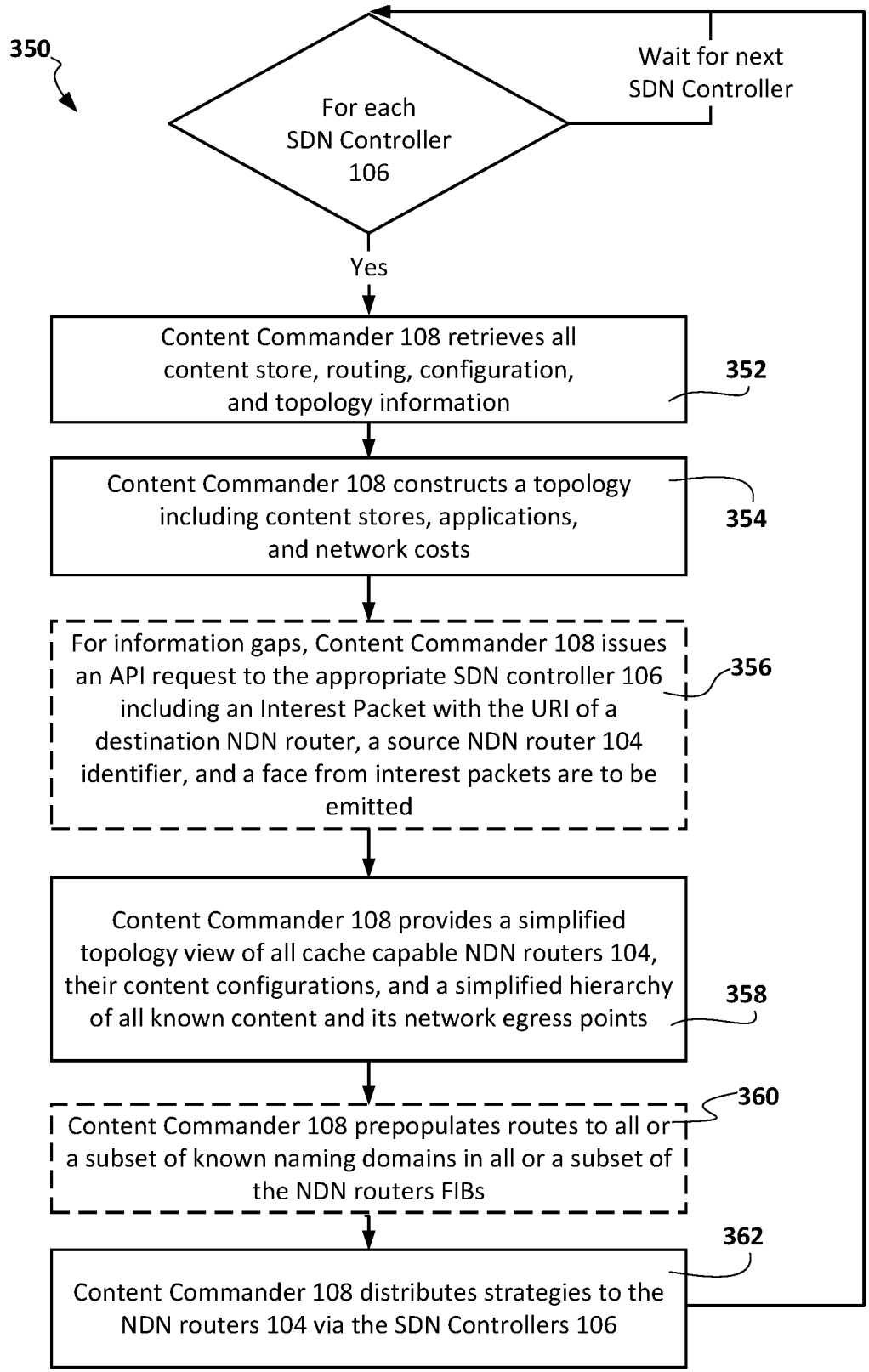

With reference to parallel initialization process 350 illustrated in FIG. 3B, for the initial state the Content Commander 108 retrieves 352 all content store, routing, configuration, and topology information identified with respect to process 300 from each SDN Controller 106. Based on this data, the Content Commander 108 constructs 354 a topology including content stores, applications, and network costs. Any gaps in the topology can be resolved by the Content Commander 108 issuing 356 an API request to the appropriate SDN controller 106, request which includes an Interest Packet with the URI of a destination NDN router 104, a source NDN router 104 identifier, and the face from which a the Interest packet should be emitted and then monitoring changes in the downstream NDN routers 104 pending interest tables that indicate the path the interest packet has followed and what path was ultimately chosen between the source NDN router face and the destination NDN router 104.

Content Commander 108 provides 358 a simplified topology view of all cache capable NDN routers 104, their content configurations, and a simplified hierarchy of all known content and its network egress points.

Figure 3C:
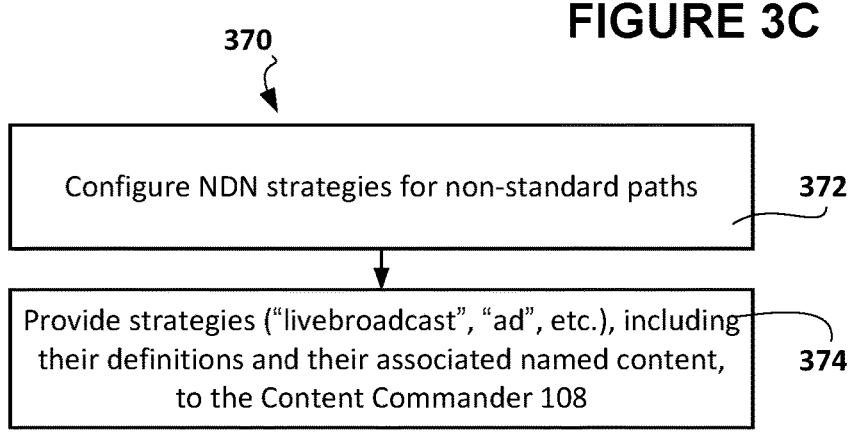

With reference to parallel initialization process 370 illustrated in FIG. 3C, Content Placement 116 is configured 372 with NDN strategies for non-standard paths. For this first use scenario example, the name "/tsn.ca/live" can be associated with the operator strategy "livebroadcast" which employs very short term live content caching on a subset of the network 102 and highlights to the system 100/200 the high likelihood of mass concurrent viewing with ads. For this first use scenario example, the name "/bell.ca/ads" can be associated with the operator (114/214) NDN strategy "ad" which will multicast the request for an ad to all known sources and accepts the ad from the shortest response time server, if the ad content is not in cache 118.

Content Placement 116 provides 374 the strategies ("livebroadcast", "ad", etc.), including their definitions and their associated named content, to the Content Commander 108, which distributes 362 (FIG. 3B) the strategies to the NDN routers 104 via the SDN Controllers 106.

In some advanced configurations, the content commander 108 and the SDN controllers 106 prepopulate 360/314 routes to all or a subset of known naming domains in all or a subset of the NDN routers FIBs. This is particularly useful in NDN where there are spurs in the network 102 or where NDN path discovery would cause too much upfront latency.

The above initial state setup process(es) can be completed before the live streaming event of this first use scenario example. For certainty, not all initialization steps need to start and complete before the start of the live streaming event. Completion before the first ad pause is sufficient. Certainly, as users 112 join the live broadcast event late, these processes may trigger again.

Either at the expiry of a time counter or based on express signaling the content provider 214 tsn.ca's live feed becomes active. New viewing devices (associated with users) 112 signal to either bell.ca or tsn.ca their intent to join the live video feed. Viewing devices 112 are either directed to or proxied through authentication with Bell (114/214) through interaction with an application or an upper level protocol like http. Successful authentication results with Bell (114/214) being informed who the users 112 are, their NDN name and location in the Bell CDN network 102. Such information can be provided by the authentication application to Content Placement 116. After successful authentication, either TSN 214 or Bell 114 responds to the user 112 with the content name within "/tsn.ca/live", DRM, and the NDN security key enabling that user 112 to playback the live streaming video.

Figure 4:
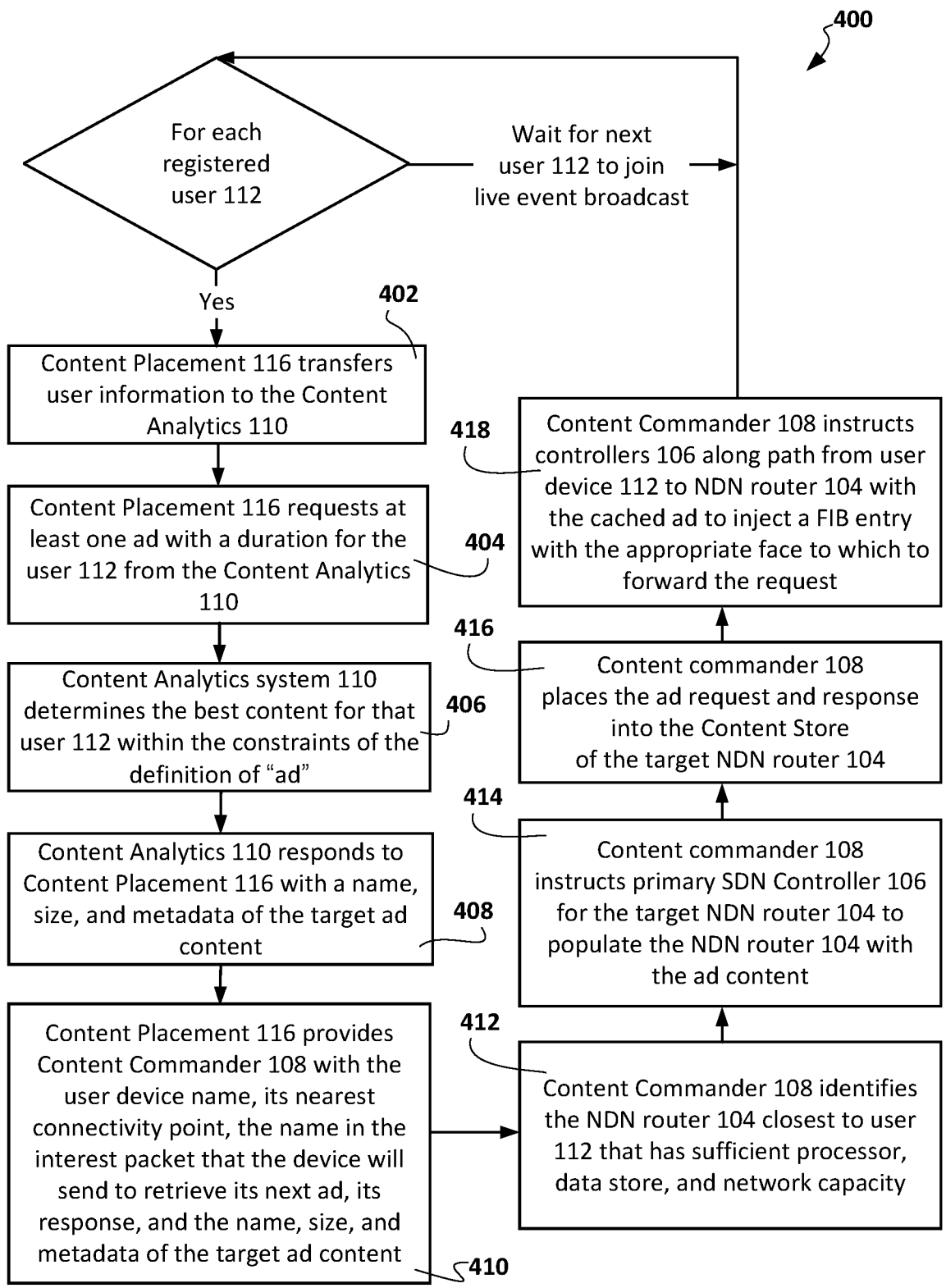
FIG. 4 is a flow diagram illustrating functionality in preparation for ad delivery in accordance with some embodiments of the proposed solution.

With reference to FIG. 4, on a per user basis, either for each registered user or as a user 112 joins the live event broadcast, preparing 400 for ad delivery includes the Content Placement 116 transferring 402 the user information potentially including identity (unique userID), device name, device network location, content being viewed, and all metadata for that content to the Content Analytics 110. Even before an actual live cut-to-ad 502, Content Placement 116 is configured to request 404 an ad or set of ads with a duration for the user 112 from the Content Analytics 110. The content analytics system 110 acts on information it has about the user 112 from a variety of sources to determine 406 the best content for that user 112 within the constraints of the definition of "ad". Content Analytics 110 responds 408 with a name, size, and metadata of the target ad content.

Content Placement 116 provides 410 Content Commander 108 with the user device name, its nearest connectivity point, the name in the interest packet that the device 112 will send to retrieve its next ad, its response, and the name, size, and metadata of the target ad content.

Content Commander 108 identifies 412 the NDN router 104 closest to the end user device 112 that has sufficient processor, data store, and network capacity.

Content commander 108 instructs 414 the primary SDN Controller 106 for the target NDN router 104 to populate the NDN router 104 with the ad content by providing the interest packet which includes the content name required to store the content on the NDN router 104 cache 118. It also places 416 the ad request and response into the NDN router's Content Store 118.

Content Commander 108 instructs 418 all primary controllers 106 along the path from the end user device 112 to the NDN router 104 with the cached ad to inject a FIB entry with the name expected in the interest packet to retrieve the ad and the appropriate face(s) to which to forward the request.

Figure 5:
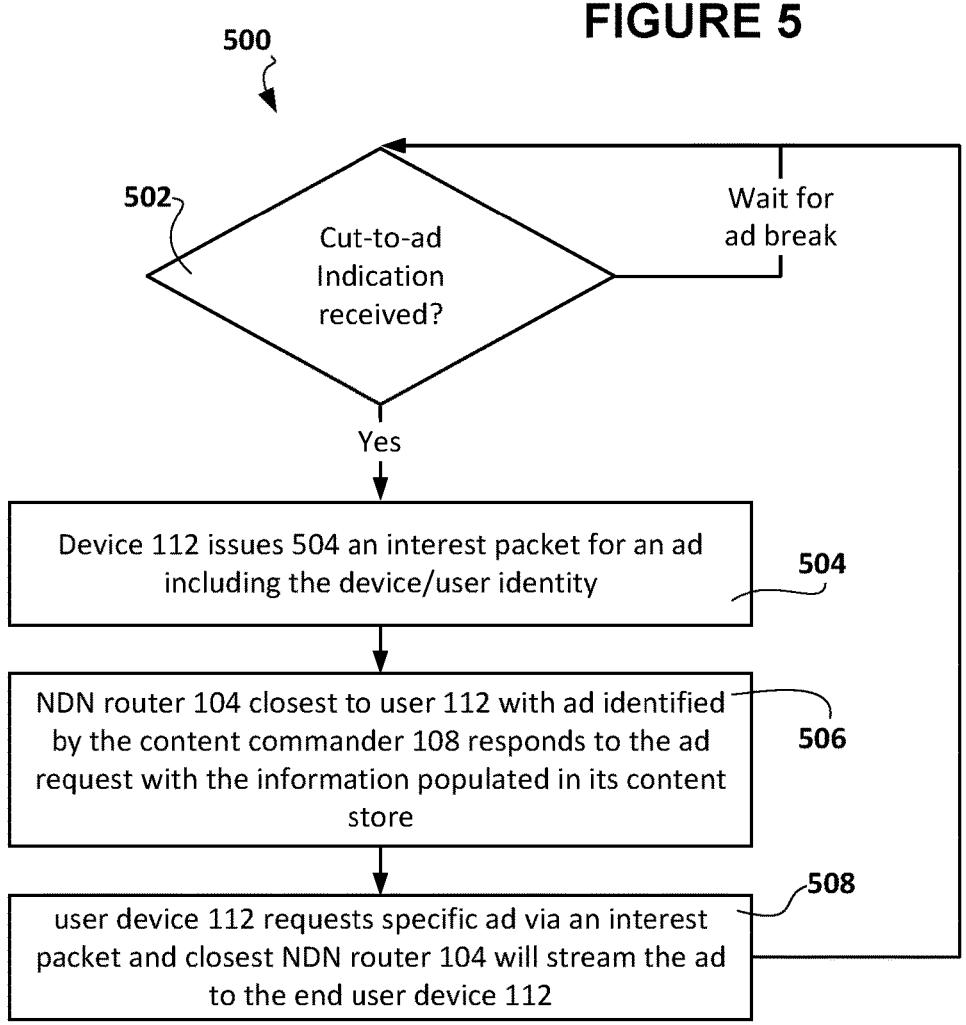
FIG. 5 is a flow diagram illustrating ad request functionality in accordance with a use scenario the proposed solution.

As briefly mentioned hereinabove, FIG. 5 illustrates an ad request process 500 triggered when the live event broadcast pauses 502 for advertising, upper layer protocols like HTTP, will cause the device 112 to issue 504 an interest packet for an advertisement that includes the device/user identity in it.

In accordance with the proposed solution, the NDN router 104 closest to the end user 112 with the ad identified by the content commander 108 will respond 506 to the ad request with the information populated from its content store 118 which points to the ad already stored in its content store 118. The end user device 112 will then request 508 the specific ad via an interest packet and the closest NDN router 104 will stream the ad to the end user device 112.

Based on the above, multiple methods could be employed in parallel to process 500 to populate all the ads needed for a live broadcast event. For example, the system can be configured to:

- Pre-populate ads around the beginning of the live streaming event. Based on the length of the live streaming event, the content placement 116 could populate ads for example three per scheduled ad break serially until sufficient ads are in place to cover the maximum number of ads anticipated for a live event of that duration.
- Pre-populate ads at intervals. The content placement system 116 can be configured to populate one or more ads at periodic intervals that are shorter than the minimum time between ad groups.
- Pre-populate ads with poling at intervals. Content placement 116 can request the content commander 108 poll the NDN router 104 that ads were placed on for a particular user's (112) device name. If the NDN router 104 has seen interest in content, then the interest would be noted in the NDN router's content store 118. The content commander 108 could then pre-populate the next set of ads.

It will be understood that live event broadcasts can experience more frequent ad breaks than planned, for example due to sports injuries, or last longer than planned, for example due to game overtimes; as such, the ads cached at NDN nodes 104 can "run out". In such instances, non-expired cached ads can be re-run, perhaps on a round-robin or random basis with notification to the content analytics 110 for ad tracking purposes. However, additional/subsequent ads can be obtained either at the next interval or by polling.

Post event, content, including ads, in the NDN router 104 cache will go stale and be wiped from the NDN routers 104 automatically. However, it is understood that some ads can go stale and be removed from cache during an extended live event broadcast either through express specification of ad expiration time duration or through overextension of the live broadcast event. In some deployments selected cached ads actually contain public announcements which can be marked to playback in a loop ("experiencing technical difficulties") or can expire immediately after being played back once. In some implementations, ads can also be played back upon loss of live stream instead of technical difficulties pubic announcements which can improve Quality of Experience while consuming the queued ads at NDN nodes 104 faster. In such implementations the content analytics 110 is informed of early playback of ads for ad tracking purposes and content placement 116/216 can be informed early with requests for additional ads.

In a similar fashion, installed routes between users 112 and content will be removed due to route changes, expiration, or discovery by the network 102, the SDN Controllers 106, or the Content Commander 108 that the content is no longer present.

Use of the above systems, components and methods are not limited to live (video/audio) streaming. In accordance with another second use scenario, the systems, components and methods described hereinabove are configured to stream library content on an individual basis.

For this second streaming content use scenario, the initial state described and illustrated hereinabove with reference to FIGS. 3A and 3B applies.

Bookwatermarking, audiowatermarking, and videowatermarking applications are placed and execute on all cache NDN routers 104 located at the edge (edge NDN routers) of the network 102. Content Placement 116 is configured 372 with NDN strategies for non-standard paths, similar to that illustrated in FIG. 3C however:

For example, the name "/library.com/ebooks" can be associated with the operator strategy "ebooks" which places copies of ebooks in the NDN caches (104) within the library network for example based on popularity, and associates the copies with the application bookwatermarking.

As another example, the name "/library.com/audiobooks" can be associated with the operator strategy "audiobooks" which places copies of audiobooks in the NDN caches 118 within the library network based on popularity and associates the copies with the application audiowatermarking.

As yet another example, the name "/library.com/video" can be associated with the operator strategy "video" which places copies of video in the NDN caches 118 within the library network based on popularity and associates the copies with the application videowatermarking.

In general, a library content stream can include streaming text (news articles, chapter books, book series, comics, etc.), streaming audio (audio books, podcast episodes, etc.), streaming video (movies, theater, shows, concerts, television series episodes, etc.) and in general archival data (letters, photo albums, etc.) General archival data can be presented in a multimedia stream sequenced for example by a search hit listing.

Content Placement 116 provides 374 the strategies including their definitions and their associated named content to the Content Commander 108 which distributes 362 the content to the NDN routers 104 closest to the customers 112 via the SDN Controllers 106.

Similar to the first use scenario, in some advanced configurations, the content commander 108 and the SDN controllers 106 prepopulate 360 routes to all or a subset of known naming domains in all or a subset of the NDN routers FIBs. This is particularly useful in NDN where there are spurs in the network or where NDN path discovery would cause too much upfront latency.

Figure 6A:
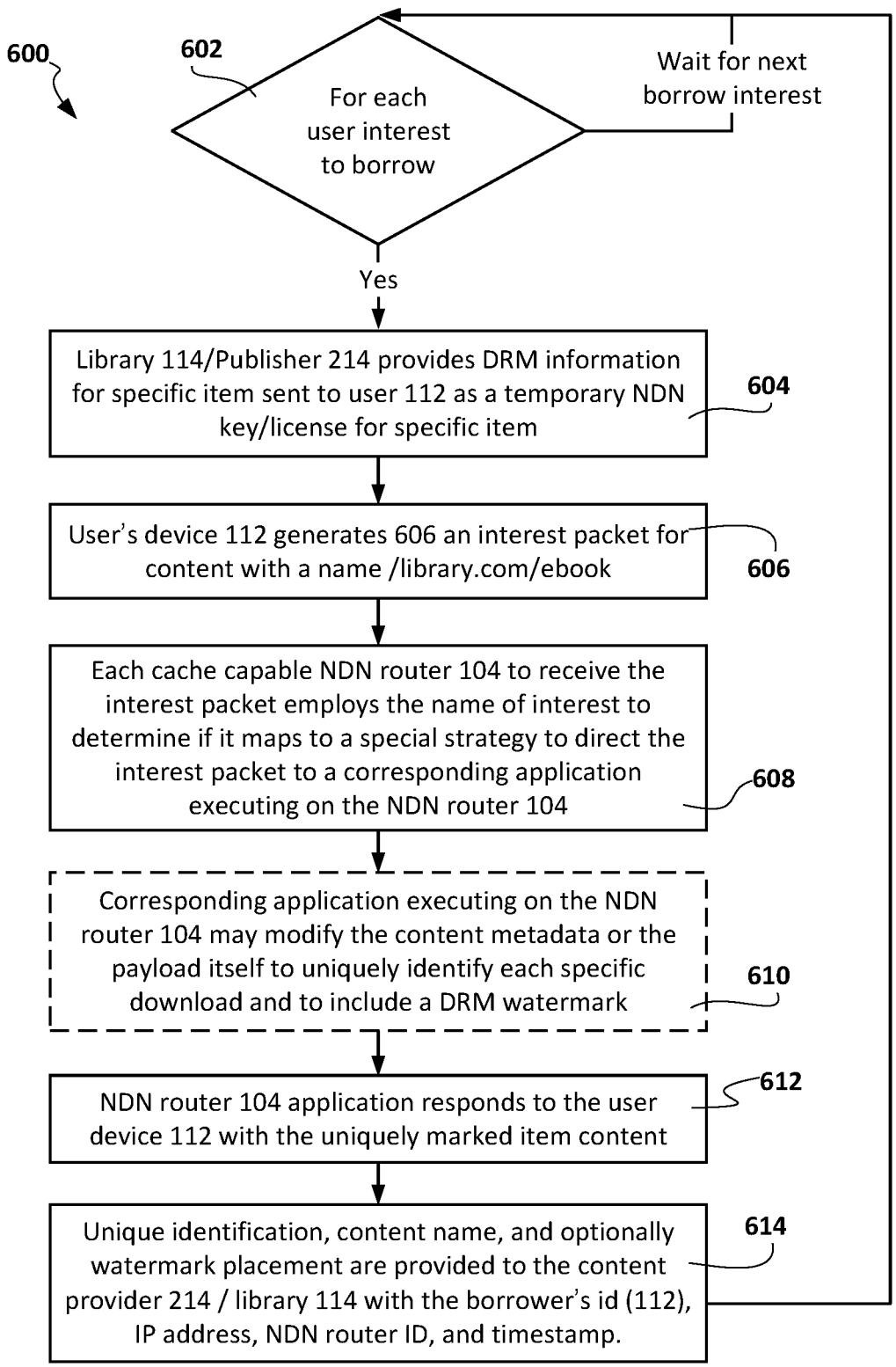
FIG. 6A is a flow diagram illustrating electronic content lending in accordance with another use scenario of the proposed solution.

For library content lending, with reference to FIG. 6A, standard NDN applies until the user 112, who has been authenticated uses a library app or webpage, signals 602 their interest to borrow an item, e.g. ebook, article, audiobook, or video. Digital Rights Management (DRM) information will be provided by the library 114 or publisher 214 and sent to the user 112 as a temporary NDN key/license for the specific item content request. The user's device 112 will generate 606 an interest packet for the content with a name of/library.com/ebook, /library.com/audiobook, or/library.com/video.

The first cache capable NDN router 104 to receive the interest packet, employs name of interest to determine 608 whether the name maps to a special strategy to direct the interest packet to a corresponding application face of an application executing on the NDN router 104. The corresponding application bookwatermarking, audiowatermarking, and/or videowatermarking may modify 610 the content metadata or the payload itself to uniquely identify each specific download and to include a DRM watermark. This modification is not required for public domain content. The NDN router application then responds 612 to the user device 112 based on the interest packet with the uniquely marked item content. The unique identification, content name, and watermark placement would be provided 614 back to the content provider 214 and/or library 114 along with the borrower's id (112), IP address, NDN router ID (104), timestamp and perhaps expiry information to a corresponding publisher 214. This information could be collected by a 3rd party application or content placement service 216 and may be relayed to its destination by the content commander 108 and/or content placement 116.

Figure 6B:
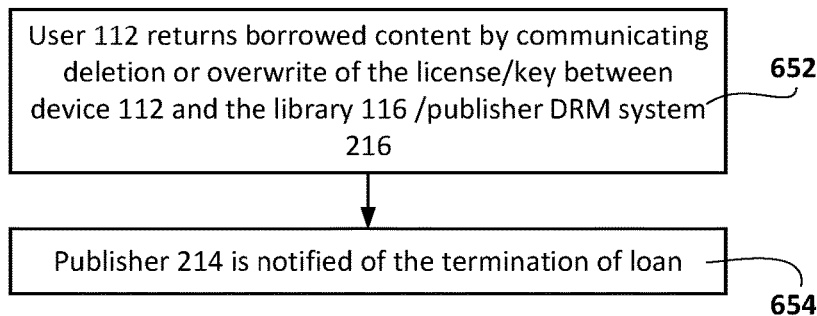
FIG. 6B is a flow diagram illustrating electronic content return in accordance the second use scenario of the proposed solution.

With reference to FIG. 6B, the user 112 can return 652 the borrowed content by communicating deletion or overwrite of the license/key between their device 112 and the library/publisher DRM system 216. Alternately, the license may expire on its own. In either case, the publisher 214 would be notified of the termination of the loan either directly or via the library 114.

Having described public library streaming content borrowing, it will be understood that processes 600 and 650 can be extended to commercial environments, for example to an electronic news organization 214 wherein the streaming content is news multimedia or to an electronic magazine organization 214 wherein the streaming content includes multimedia articles. In such deployments the browser/reader application 112 displaying the streaming content to the user employs an electronic bookmark following the progress of the user in consuming the content article(s). Once the user 112 visits the organization's 214 website, the systems and components presented herein are preconfigured in accordance with process 400 illustrated in FIG. 4.

Metadata corresponding to content in view can be employed as a bookmark by the user application 112 to pull ads in a similar fashion to process 500 illustrated in FIG. 5 however unsynchronized from other user applications 112. For example, a cooking electronic magazine can provide a stream of articles on baking cookies, the user 112 reads a few articles and when (502) a particular recipe is displayed, the user application 112 uses recipe metadata to request 504 an ad. The NDN router 104 closest to the user 112 responds with a local store coupon for a discount to a fancy cookie cutter. Which cookie cutter is discounted can be determined in real-time, for example depending on the time of the year the user 112 reads the article: ice cream shaped cookie cutter for summer, snow flake shaped cookie cutter for winter, etc.

Again, without fresh interest requests for ads, content and ads in the NDN router cache 118 will go stale and be wiped from the NDN routers 104 automatically. However, it is understood that some ads can go stale and be removed from cache during an extended content view/read through express specification of ad expiration time duration. In a similar fashion, installed routes between users 112 and content will be removed due to route changes, expiration, or discovery by the network 102, the SDN Controllers 106, or the Content Commander 108 that the content is no longer present.

For certainty, the streaming content of the first use scenario can be rerun in accordance with the second use scenario wherein the cut-to-ad 502 functionality is replaced with bookmark progression functionality while employing the same systems, components and methods as described herein. The change can be implemented via a "rerun" strategy in stead of the "livebroadcast" strategy.

Use of the above systems, components and methods are not limited to continuous stream audio/visual services. In accordance with another third use scenario, the systems, components and methods described hereinabove are configured to provide public announcement functionality. For example, such public announcement services and functionality is described in the context of a sequence of public transport updates at a port, airport or station which includes caching of safety and weather data along with transport route data. While specific reference is made to an airport and flights in the following description, it will be understood that the following description applies with appropriate changes in details to other modes of mass transit. Differences are implemented via a "transport announcement" strategy wherein the streaming content is a sequence of current information updates and weather data, and progression through content is the passage of time.

For this third use scenario, the initial state described and illustrated hereinabove with reference to FIGS. 3A and 3B applies.

Airline, airport, and emergency management applications can be deployed in different NDN routers 104 based on the position of the NDN routers 104 in an airport to serve sequences of public transport announcements which correspond to ad functionality described hereinabove with respect to the first and second use scenarios. Strategies can be deployed on the NDN routers 104 to direct particular name hierarchies to airline applications and airport applications executing on the NDN routers 104. The default strategy can be defined to pass messaging announcement requests through to an emergency management application pre-installed on the NDN routers 104. By default, the emergency management application, simply passes the interest and data packets to cache/next hop via standard NDN.

Content Placement 114 can be configured to place information key for aviation flight plans and logistics in NDN routers 104 close to flight operations and pilot lounges based on pre-provisioned policies. Similarly, content placement 114 can also be preprogrammed to distribute weather, airport status, flight status, and safety data to passenger, operations, and pilot areas.

Mobile devices 112 in range with actively running or background running airline or airport applications authenticate with their counterparts in their nearest NDN router 104 and hand off to the next router 104 as the mobile devices 112 move around the airport. For example, a mobile application 112 executing on a mobile phone of a user 112, as in the previous use scenarios, registers with either the airport 114 or with an airline 214. As part of the registration, the user expresses an interest in either arrivals or departure updates, either specifically or implicitly for example depending on registration of a boarding pass. Mobile devices 112 can be tagged with bookings and boarding passes held for that specific day.

In similar fashion to the ad functionality described hereinabove with respect to the first and second use scenarios, each NDN router 104 can be prepopulated with public announcement information regarding evacuation routes, airport, and airline customer service locations.

The mobile application 112 otherwise displays arrivals/departure data and weather data in a loop or the output of the mobile application 112 can be specific to a flight number. For example, the user 112 can interact with the mobile application 112 to refresh the flight data.

Figure 7:
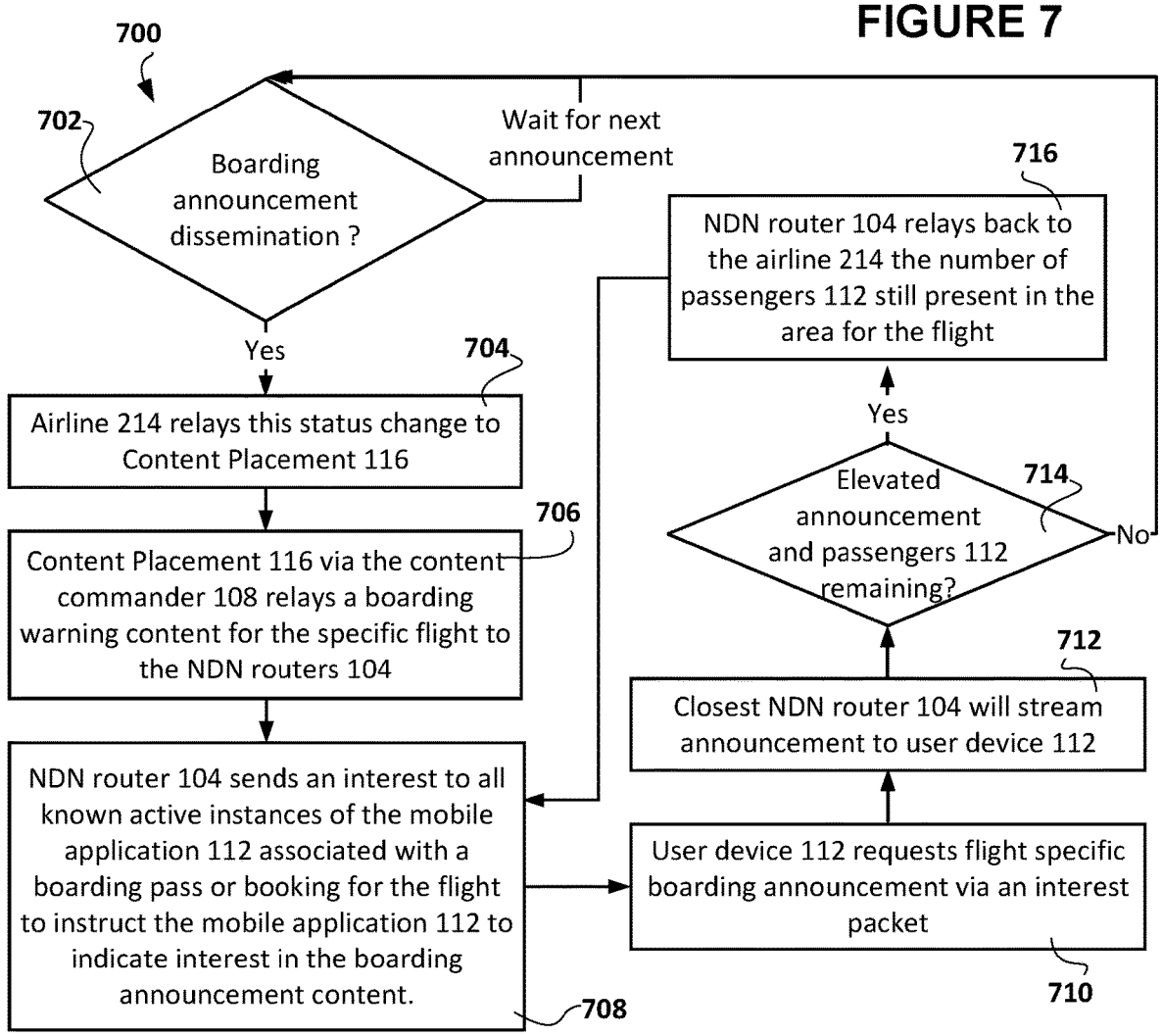
FIG. 7 is a flow diagram illustrating a boarding process in accordance with yet another use scenario of the proposed solution.

In accordance with a boarding process 700 illustrated in FIG. 7, the above described cut-to-ad functionality, is employed in this third use scenario to implement delayed, canceled, pre-boarding and boarding announcement dissemination.

When a flight has entered 702 either a pre-boarding state or a boarding state, the airline 214 relays 704 this status change to the content placement 116. Content placement 116 via the content commander 108 relays 706 a boarding warning for the specific flight to the NDN routers 104 not within the secured portions of the airport and sends a message the airline application in the NDN router 104 identifying the warning content and flight number. The NDN router 104 can send an interest to all known active instances of the mobile application 112 associated with a boarding pass or booking for the given flight to instruct the mobile applications 112 to indicate interest in the pre-boarding announcement content.

When a flight has entered a boarding state, the airline can relay this status change to the content placement 116. Content placement 116 via the content commander 108 relays 706 boarding announcement content for the specific flight to the NDN routers 104 within the passenger portions of the airport and sends a message the airline application in the NDN router 104 identifying the boarding announcement content and flight number. The NDN router 104 sends 708 an interest to all known active instances of the mobile application 112 associated with a boarding pass or booking for the given flight to instruct the mobile application 112 to indicate interest in the boarding announcement content. The user device 112 requests 710 flight specific boarding announcement via an interest packet and the closest NDN router 104 will stream 712 the announcement to the end user device 112. This is similar to the cut-to-ad functionality of the first use scenario.

However, a number of boarding related announcements can be considered elevated, for example flight's gate changed announcements, a flight entering a final call state, etc. Process 700 repeats from 702 with the mobile application 112 ultimately indicating 712 an interest in the elevated announcement. The process 700 however continues by determining 714 that the announcement is an elevated announcement and identifies passengers 112 remaining in the area of out-of-date gate NDN router 104 or at the final boarding gate NDN router 104. Perhaps after a time delay, the airline application on the NDN router 104 relays back to the airline 214 the number of passengers 112 remaining behind in the area of the NDN router 104 for the flight and resends interest 708.

Figure 8:
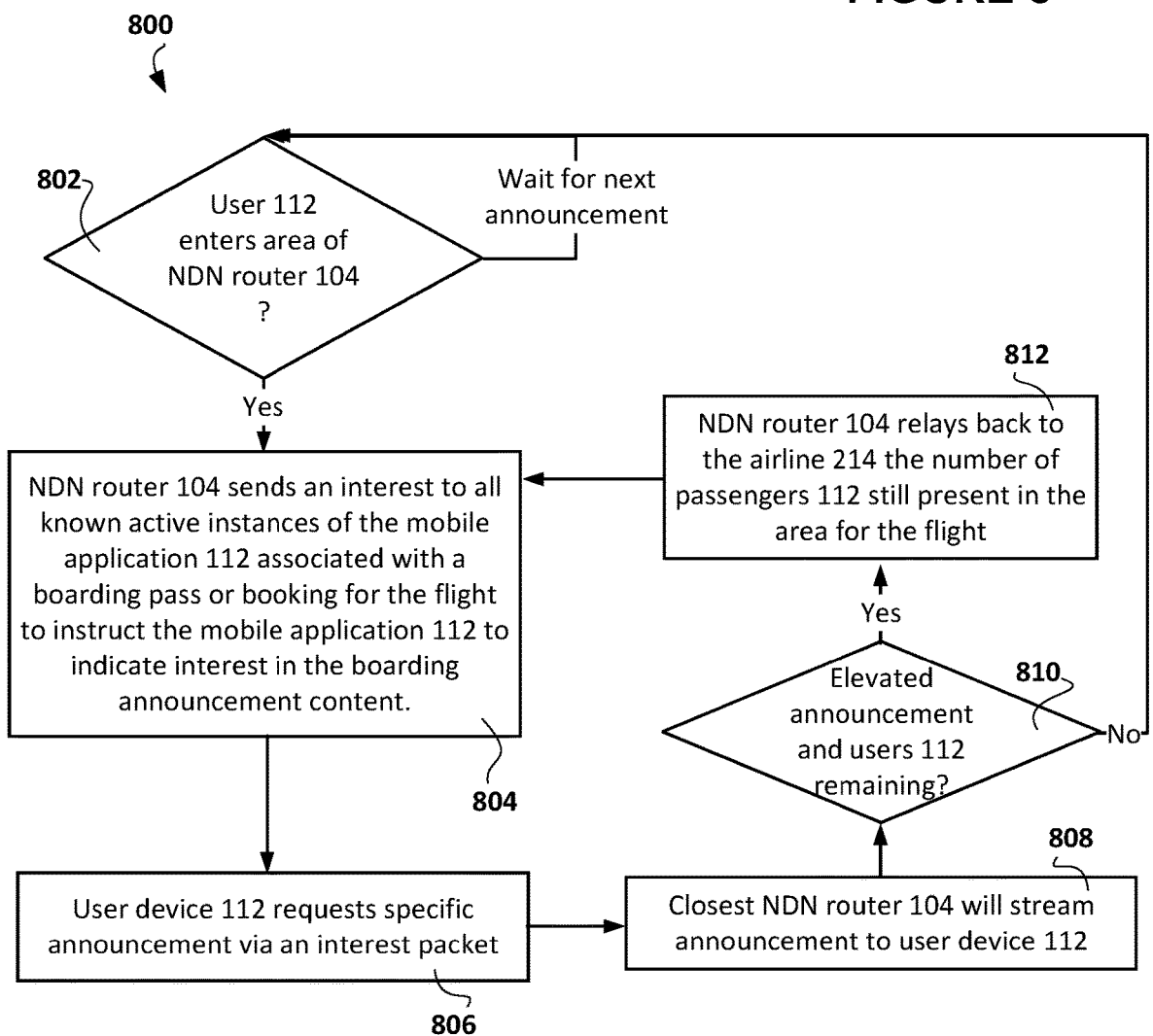
FIG. 8 is a flow diagram illustrating ay emergency announcement dissemination process in accordance with the third use scenario of the proposed solution.

In accordance with the systems and methods presented herein, process 800 illustrated in FIG. 8 is employed to disseminate special announcements, for example:

As part of initialization, content placement 116 via the content commander 108 can prepopulate NDN routers 104 near areas of construction or other hazards with safety announcement content. As mobile devices 112 approach 802 these NDN routers 104, the NDN router 104 can be configured to send 804 an interest to these active instances of the mobile application 112 to tell them to indicate interest in the construction/hazard content.

Similarly, if an airport is experiencing a service impact, for example controller shortages, lightning, worker strikes, etc., service impact content could be distributed to all applicable areas of the airport by the content controller 106 and the content commander 108. As mobile devices 112 approach 802 these NDN routers 104, the NDN router 104 could send 804 an interest to all known active instances the mobile application 112 to tell them to indicate interest in the service impact content.

In both examples, the user device 112 requests 806 the specific announcement via an interest packet and the closest NDN router 104 provides 808 the announcement to the user device 112. Note however, that in process 800 airline applications on the user's device 112 and airport applications on the user's device 112 are treated equally, for example flight specific functionality is irrelevant.

Again, special announcements can themselves be elevated. If an emergency event has occurred that requires airport evacuation, the airport would provide emergency content for the emergency which would immediately be distributed to all NDN routers 104. Any NDN interest 806 coming from any user's device 112 would be redirected to the cached content 118 of the same format being requested and have the NDN router 104 specific area evacuation information appended to the emergency content provided 808. The airline application executing on the NDN router 104 can determine 810 if users 112 remain after an elevated special announcement and notifies 812 the airline of any mobile devices 112 present in the area of the NDN router 104 as identified by the specified interest (804).

Figure 9:
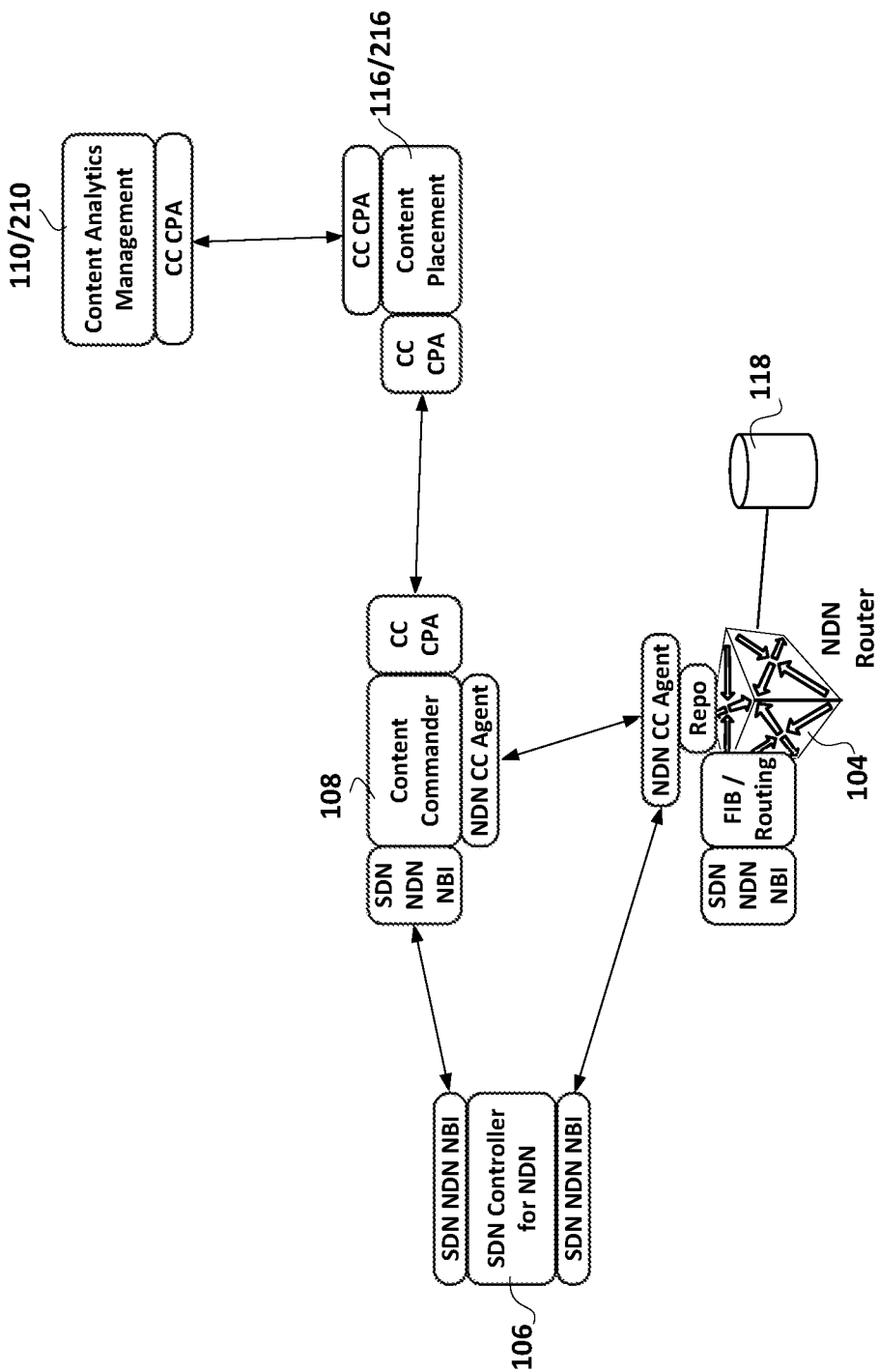
FIG. 9 is a schematic diagram illustrating cooperating application programming interfaces in accordance with an implementation of the proposed solution.

In order to implement at least some of the above functionality the proposed solution includes a group of Application Programming Interfaces (APIs) and/or communication protocols and a set of compute engines configured for the purpose. With reference to FIG. 9, such components of a combined SDN/NDN solution include:

Content Analytics/Content Placement Agents (CA CPA)

CA/CPA agents are present on the content analytics 110/210 and content placement 116/216 systems and employ APIs and/or communications protocols to communicate at a minimum target content, which would also include Ads & Personal content, from the Content Analytics 110/210 to the Content Placement platform 116/216. CA/CPA agents can also be configured to provide a wide variety of information about the target users 112 (e.g. devices, telemetry, historical time of day use, likelihood of access) for the content and target performance (e.g. content type, minimum bandwidth, minimum latency, etc.) for the content. CA/CPA agents can be configured to transmit this information by providing all content recommendations, added content recommendations, deleted content recommendations, and attribute changes. In the opposite direction, CA/CPA agents can be configured to transmit configuration changes to the analytics platform 110/210 and optionally real-time policy updates on what criteria should be used to make a content recommendation.

Content Commander/Content Placement Agent (CC CPA)

Content Commander/Content Placement Agents are present on the content placement 116/216 and content commander 108 systems. Content Commander/Content Placement Agents employ APIs and/or communications protocols to communicate target content, where the targeted cache points are, and a mapping of the content to end user 112 locations where paths should be pre-established. In some implementations, performance information requirements and priorities can also be included in the communications. In the reverse direction, the content commander 108 is configured to relay to content placement 116/216 a view of the stable topology and nodal cache fill.

Named Data Network Software Defined Network Northbound Interface Agent (NDN SDN NBI)

Named Data Network Software Defined Network Northbound Interface agents are designed to play a similar role to the software defined network northbound interface modified to employ URI's instead of IP addresses (e.g. modified Openflow or netconf). The content commander 108 provides the SDN controller 106 source and destination URI pairs to connect content (at a cache or source) to the NDN router 104 closest to one or more target end users 112 and an action (add, remove, change). Optionally, the Named Data Network Software Defined Network Northbound Interface can provide requirements for each connection (e.g. reserved bandwidth, latency). The SDN controller 106 provides success and/or error messages to the Content Commander 108, in some implementations the SDN controller 106 is configured to also provide statistics and events to the Content Commander 108.

Named Data Network Software Defined Network Southbound Interface Agent (NDN SDN NBI)

Named Data Network Software Defined Network Southbound Interface agents are configured to play a similar role to the software defined network southbound interface modified to employ URI's instead of IP addresses (e.g. modified Openflow or netconf). The SDN controller (106) messages configure the NDN Forwarding Information Base (FIB), configure NDN strategies, and/or routing processes in each NDN router 104 along each path from target user location 112 to content. The NDN router 104 can be configured to provide statistics and events to the SDN controller 106.

Named Data Network Content Commander Agent (NDN CCA)

Named Data Network Content Commander agents are present on the NDN router 104 and content commander systems 108. Named Data Network Content Commander agents employ APIs and/or communications protocols to communicate between the content commander 108 and the NDN router 104. Each Named Data Network Content Commander agent on the NDN router 104 configures the NDN Repo application to accept new content and delete existing cached content based on instructions from the content commander 108. Named Data Network Content Commander agent on the NDN router 104 can also be configured to populate the NDN Pending Interest Table (PIT), define, remove, and configure network and application faces in the NDN router 104, download, install, remove and configure applications on the NDN router 104, and inject packets into the data stream that request the content from its source which will in turn be cached on the NDN router 104. In the reverse direction, the NDN router 104 is configured to send to the content commander 108 success and failure messages, statistics, and events.

For certainty, such processes are understood to be employed either in sequence or in parallel with other such process, but not limited to ones described above. In particular, the above functionality can be implemented in coded logic instructions executed by firmware and hardware such as illustrated in FIG. 10.

Figure 10:
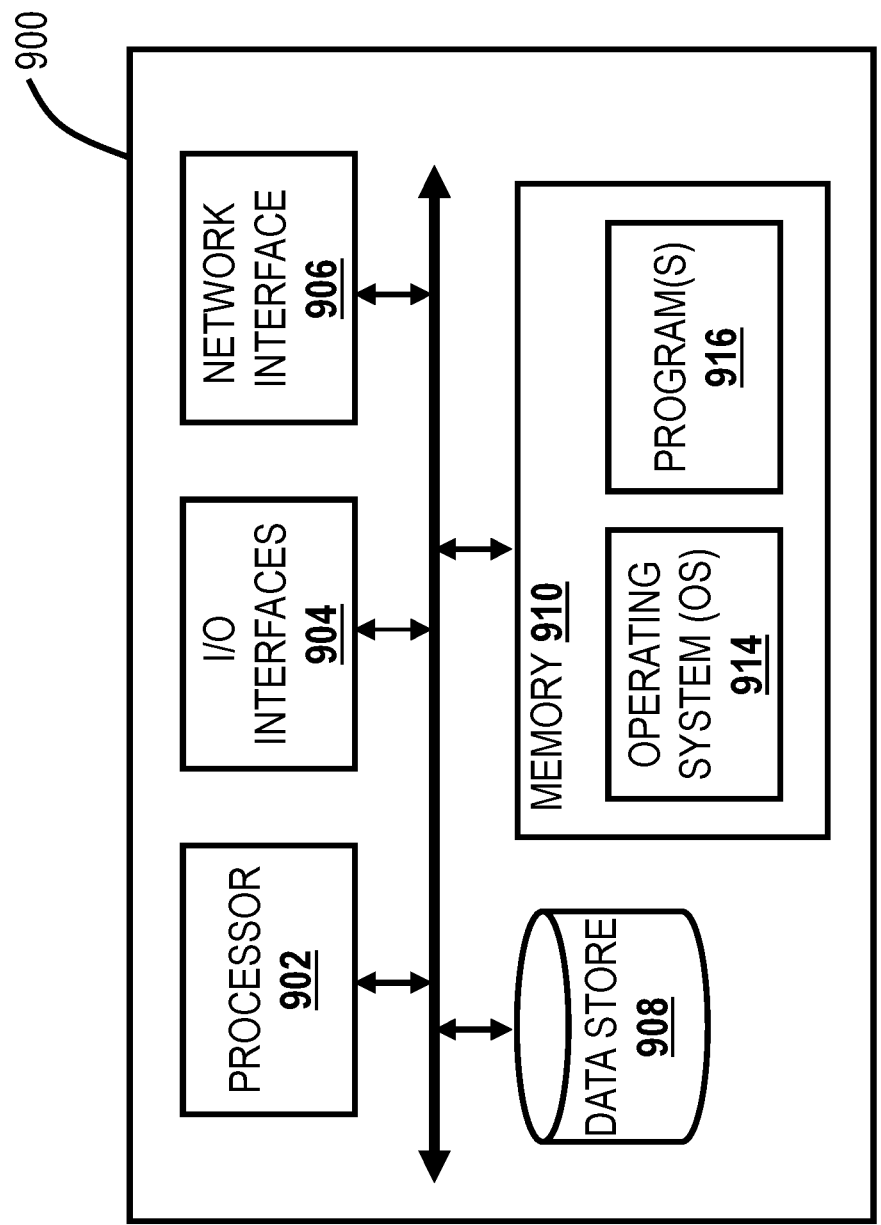
FIG. 10 is a schematic diagram illustrating a computing system configured to implement aspects of the proposed solution.

Referring to FIG. 10, a block diagram illustrates an example of an implementation of an NDN router 104, content commander 108, content provider device 114/214, content placement device 116/216, content analytics and management server 110/210. For example, such network components can be implemented in a digital processing device that, in terms of hardware architecture, generally includes a processor 902, input/output (I/O) interfaces 904, a network interface 906, a data store 908, and memory 910. It should be appreciated by those of ordinary skill in the art that FIG. 10 depicts the controller 900 in an oversimplified manner, and a practical embodiment may include additional components and suitably configured processing logic to support known or conventional operating features that are not described in detail herein. The components (902, 904, 906, 908, and 910) are communicatively coupled via a local interface 912. The local interface 912 can be, for example but not limited to, one or more buses or other wired or wireless connections, as is known in the art. The local interface 912 can have additional elements, which are omitted for simplicity, such as controllers, buffers (caches), drivers, repeaters, and receivers, among many others, to enable communications. Further, the local interface 912 can include address, control, and/or data connections to enable appropriate communications among the aforementioned components.

The processor 902 is a hardware device for executing software instructions. The processor 902 can be any custom made or commercially available processor, a central processing unit (CPU), an auxiliary processor among several processors associated with the controller 900, a semiconductor-based microprocessor (in the form of a microchip or chip set), or generally any device for executing software instructions. When the controller 900 is in operation, the processor 902 is configured to execute software stored within the memory 910, to communicate data to and from the memory 910, and to generally control operations of the controller 900 pursuant to the software instructions. The I/O interfaces 904 can be used to receive user input from and/or for providing system output to one or more devices or components. For example, if the controller 900 is included in a network element, the I/O interfaces 904 can include backplane connections or the like to communicate with other components in the network element. The network interface 906 can be used to enable the controller 900 to communicate on a network.

The data store 908 can be used to store data. The data store 908 can include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 908 can incorporate electronic, magnetic, optical, and/or other types of storage media. The memory 910 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 910 can incorporate electronic, magnetic, optical, and/or other types of storage media. Note that the memory 910 can have a distributed architecture, where various components are situated remotely from one another, but can be accessed by the processor 902. The software in memory 910 can include one or more software programs, each of which includes an ordered listing of executable instructions for implementing logical functions. The software in the memory 910 includes a suitable operating system (O/S) 914 and one or more programs 916. The operating system 914 essentially controls the execution of other computer programs, such as the one or more programs 916, and provides scheduling, input-output control, file and data management, memory management, and communication control and related services. The one or more programs 916 may be configured to implement the various processes, algorithms, methods, techniques, etc. described herein. For example, the programs 916 can be configured to implement method(s) described herein.

Additionally, it will be appreciated that in accordance with some embodiments described herein, such as the controller 900, may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various embodiments.

Moreover, some embodiments may be implemented as a non-transitory computer-readable storage medium having computer readable code stored thereon for programming a computer, server, router, appliance, device, etc. each of which may include a processor to perform methods as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor that, in response to such execution, cause a processor or any other circuitry to perform a set of operations, steps, methods, processes, algorithms, etc. as described herein for the various embodiments.

Figure 11:
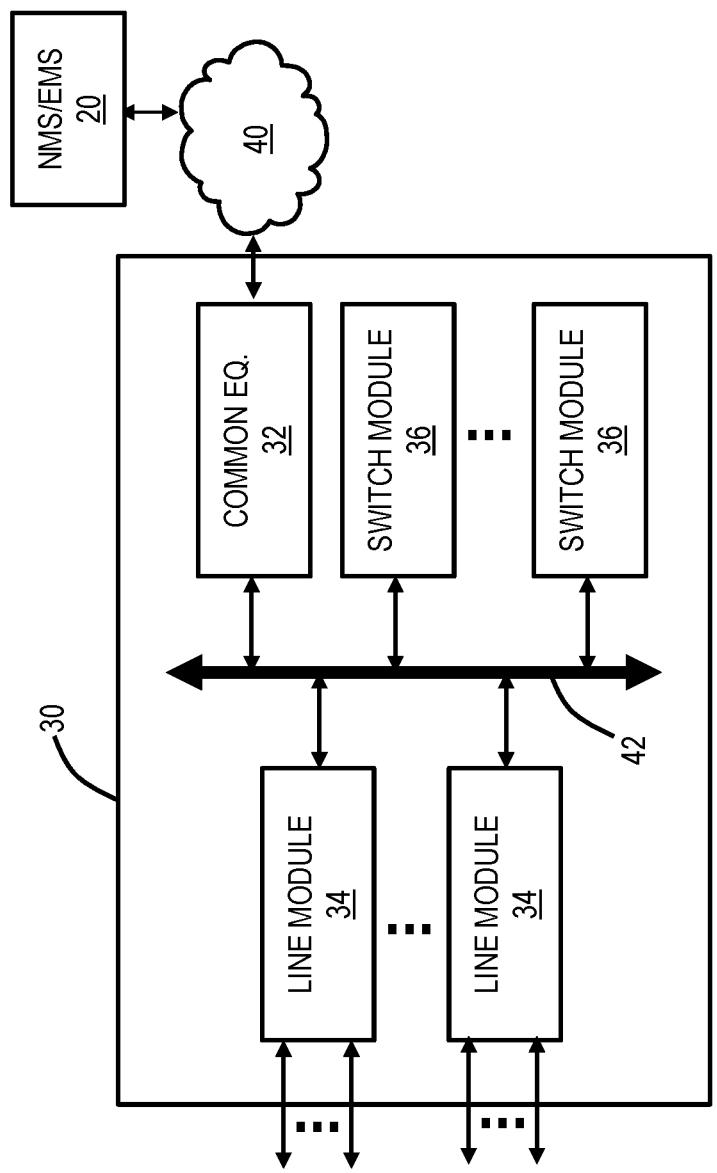
FIG. 11 is a schematic diagram illustrating a network node configured to implement aspects of the proposed solution, wherein similar features bear similar labels throughout the drawings. While the sequence described can be of significance, reference to "first", "next", and "last" qualifiers in the present specification is made solely with reference to the description as presented in the application and does not imply any absolute event sequence. For certainty, multiple steps described herein can proceed concurrently in parallel.

Referring to FIG. 11, a block diagram illustrates an example of an implementation of an NDN router 104 incorporating network node 30 for use with the systems and methods described herein. Other network nodes 30 without NDN capabilities (not illustrated) are typically employed in a CDN network 102. In an implementation, node 30 can be a network element that may consolidate the functionality of a Multi-Service Provisioning Platform (MSPP), Digital Cross-Connect (DCS), Ethernet and/or Optical Transport Network (OTN) switch, Wave Division Multiplexed (WDM)/DWDM platform, Packet Optical Transport System (POTS), etc. into a single, high-capacity intelligent switching system providing Layer 0, 1, 2, and/or 3 consolidation.

In another implementation, node 30 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, node 30 can be any digital and/or optical system with ingress and egress digital and/or optical signals and switching of channels, timeslots, tributary units, wavelengths, etc. While the node 30 is generally shown as an optical network element, the systems and methods contemplated for use with any switching fabric, network element, or network-based thereon.

For example, node 30 includes common equipment 32, one or more line modules 34, and one or more switch modules 36. The common equipment 32 can include power; a control module; OAM&P access; user interface ports; and the like. The common equipment 32 can include controller 900 for an NDN router 104 however the common equipment 32 can be configured to connect to NMS 20 through a data communication network (DCN) 40 (as well as a Path Computation Element (PCE), the SDN controller 106, OpenFlow controller, etc.). The NMS 20 can also be an Element Management System (EMS), or the like. Additionally, the common equipment 32 can include a control plane processor, such as a controller 900 illustrated in FIG. 10 configured to operate the control plane as described herein. The node 30 can include an interface 42 for communicatively coupling the common equipment 32, the line modules 34, and the switch modules 36 to one another. For example, the interface 42 can be a backplane, midplane, a bus, optical and/or electrical connectors, or the like. The line modules 34 are configured to provide ingress and egress to the switch modules 36 and to external connections on the links to/from the node 30. In an implementation, the line modules 34 can form ingress and egress switches with the switch modules 36 as center stage switches for a three-stage switch, e.g., a three-stage Clos switch. Other configurations and/or architectures are also contemplated. The line modules 34 can include optical transceivers, such as, for example, 1 Gb/s (GbE PHY), 2.5 GB/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), ODUflex, OTUCn, Flexible Ethernet, etc.

Further, the line modules 34 can include a plurality of optical connections per module and each module may include a flexible rate support for any type of connection, such as, for example, 155 Mb/s, 622 Mb/s, 1 Gb/s, 2.5 Gb/s, 10 Gb/s, 40 Gb/s, 100 Gb/s, 400 Gb/s, N×1.25 Gb/s, and any rate in between as well as future higher rates. The line modules 34 can include WDM interfaces, short reach interfaces, and the like, and can connect to other line modules 34 on remote network elements, end clients, edge routers, and the like, e.g., forming connections on the links in the network 10. From a logical perspective, the line modules 34 provide ingress and egress ports to the node 30, and each line module 34 can include one or more physical ports. The switch modules 36 are configured to switch channels, timeslots, tributary units, packets, etc. between the line modules 34. For example, the switch modules 36 can provide wavelength granularity (Layer 0 switching); OTN granularity; Ethernet granularity; and the like. Specifically, the switch modules 36 can include Time Division Multiplexed (TDM) (i.e., circuit switching) and/or packet switching engines. The switch modules 36 can include redundancy as well, such as 1:1, 1:N, etc. In an exemplary embodiment, the switch modules 36 provide OTN switching and/or Ethernet switching.

Those of ordinary skill in the art will recognize the node 30 can include other components which are omitted for illustration purposes, and that the systems and methods described herein are contemplated for use with a plurality of different network elements with the node 30 presented as an example of a type of network element. For example, in another embodiment, the node 30 may not include the switch modules 36, but rather have the corresponding functionality in the line modules 34 (or some equivalent) in a distributed fashion. For the node 30, other architectures providing ingress, egress, and switching are also contemplated for the systems and methods described herein. In general, the systems and methods described herein contemplate use with any network element 30 providing switching of channels, timeslots, tributary units, wavelengths, etc. and using the control plane, the SDN controller 106, etc. Furthermore, the node 30 is merely presented as one example of a node 30 for the systems and methods described herein.

At least some benefits derived from implementing the above in an CDN network 102 include: increased content control, greater content delivery efficiency in terms of an ability to trade off bandwidth, storage, QoE/performance, generally better Quality of Experience to the end user, and a realistic Content Provider/Service Provider Business model for content delivery to the user.

While the proposed solution has been described in the context of Named Data Networking (NDN) solely for clarity of description, the invention could equally apply to any Information Centric Network (ICN).

While the invention has been illustrated and described with reference to preferred embodiments thereof, it will be recognized by those skilled in the art that various changes in form and detail may be made therein without departing from the spirit and scope of the invention as defined by the appended claims.

What is claimed is:

1. A non-transitory computer-readable storage medium having computer readable code stored thereon for programming a processor to perform steps of:
    obtaining information from a Software Defined Networking (SDN) controller communicatively coupled to a plurality of devices in a Content Distribution Network (CDN) that utilizes Named Data Networking (NDN), wherein the SDN controller and the plurality of devices communicate via an NDN-SDN interface;
    determining a topology including stores for content on the plurality of devices based on the information; and
    providing the topology and NDN strategies to the plurality of devices via the SDN contoller which configures Forwarding Information Bases of the plurality of devices with SDN messages for NDN, wherein the NDN strategies each relate to forwarding paths for content to user devices based on the topology.

2. The non-transitory computer-readable storage medium of claim 1, wherein the SDN controller is a first SDN controller, and further comprising
    performing the obtaining step with one or more additional SDN controllers for additional information; and
    performing the determining and providing steps with the additional information.

3. The non-transitory computer-readable storage medium of claim 1, wherein the steps further include
    requesting caching of some of the content on any of the plurality of devices via one of communicating to an agent or application on a device and injecting a request into the CDN via any of network management, orchestration, and the SDN controller.

4. The non-transitory computer-readable storage medium of claim 1, wherein the steps further include
    obtaining content information including the content likely to be requested by users and timeframe; and
    requesting caching of the content on the plurality of devices based on the content information.

5. The non-transitory computer-readable storage medium of claim 1, wherein the steps further include
    obtaining results related to analysis of content usage information; and
    identifying placement of the content at the plurality of devices based on the results.

6. The non-transitory computer-readable storage medium of claim 1, wherein the steps further include
    for some content of the content, causing placement of the some content at multiple devices of the plurality of devices that are geographically diverse from one another.

7. The non-transitory computer-readable storage medium of claim 1, wherein the steps further include
    providing routes to all or a subset of known naming domains in all or a subset of the Forwarding Information Bases of the plurality of devices.

8. The non-transitory computer-readable storage medium of claim 1, wherein the CDN utilizes Universal Resource Identifiers (URIs).

9. A server connected to a Content Distribution Network (CDN) executing coded logic configured to:
    obtain information from a Software Defined Networking (SDN) controller communicatively coupled to a plurality of devices in a Content Distribution Network (CDN) that utilizes Named Data Networking (NDN), wherein the SDN controller and the plurality of devices communicate via an NDN-SDN interface;
    determine a topology including stores for content on the plurality of devices based on the information; and
    provide the topology and NDN strategies to the plurality of devices via the SDN contoller which configures Forwarding Information Bases of the plurality of devices with SDN messages for NDN, wherein the NDN strategies each relate to forwarding paths for content to user devices based on the topology.

10. The server of claim 9, wherein the SDN controller is a first SDN controller, and wherein the coded logic is further configured to
    obtain additional information from one or more additional SDN controllers; and
    determine the topology with the additional information.

11. The server of claim 9, wherein the SDN controller is a first SDN controller, and wherein the coded logic is further configured to
    request caching of some of the content on any of the plurality of devices via one of communication to an agent or application on a device and injection of a request into the CDN via any of network management, orchestration, and the SDN controller.

12. The server of claim 9, wherein the SDN controller is a first SDN controller, and wherein the coded logic is further configured to
    obtain content information including the content likely to be requested by users and timeframe; and
    request caching of the content on the plurality of devices based on the content information.

13. The server of claim 9, wherein the SDN controller is a first SDN controller, and wherein the coded logic is further configured to
obtain results related to analysis of content usage information; and
identify placement of the content at the plurality of devices based on the results.

14. The server of claim 9, wherein the SDN controller is a first SDN controller, and wherein the coded logic is further configured to
for some content of the content, cause placement of the some content at multiple devices of the plurality of devices that are geographically diverse from one another.

15. The server of claim 9, wherein the SDN controller is a first SDN controller, and wherein the coded logic is further configured to
provide routes to all or a subset of known naming domains in all or a subset of the Forwarding Information Bases of the plurality of devices.

16. A method comprising:
obtaining information from a Software Defined Networking (SDN) controller communicatively coupled to a plurality of devices in a Content Distribution Network (CDN) that utilizes Named Data Networking (NDN), wherein the SDN controller and the plurality of devices communicate via an NDN-SDN interface;
determining a topology including stores for content on the plurality of devices based on the information; and
providing the topology and NDN strategies to the plurality of devices via the SDN contoller which configures Forwarding Information Bases of the plurality of devices with SDN messages for NDN, wherein the NDN strategies each relate to forwarding paths for content to user devices based on the topology.

17. The method of claim 16, further comprising
Requesting caching of some of the content on any of the plurality of devices via one of communicating to an agent or application on a device and injecting a request into the CDN via any of network management, orchestration, and the SDN controller.

18. The method of claim 16, further comprising
obtaining content information including the content likely to be requested by users and timeframe; and
requesting caching of the content on the plurality of devices based on the content information.

19. The method of claim 16, further comprising
obtaining results related to analysis of content usage information; and
identifying placement of the content at the plurality of devices based on the results.

20. The method of claim 16, further comprising
for some content of the content, placing the some content at multiple devices of the plurality of devices that are geographically diverse from one another.

* * * * *